June 23, 1970   E. E. HERMAN ET AL   3,517,118
LINE-BY-LINE TRACKER WITH AUTOMATICALLY CORRECTING BEAM
DEFLECTION CIRCUIT
Filed Oct. 17, 1966   3 Sheets-Sheet 1

INVENTORS
ELVIN E. HERMAN
WILLIAM H. PROUD
BY
ATTORNEY

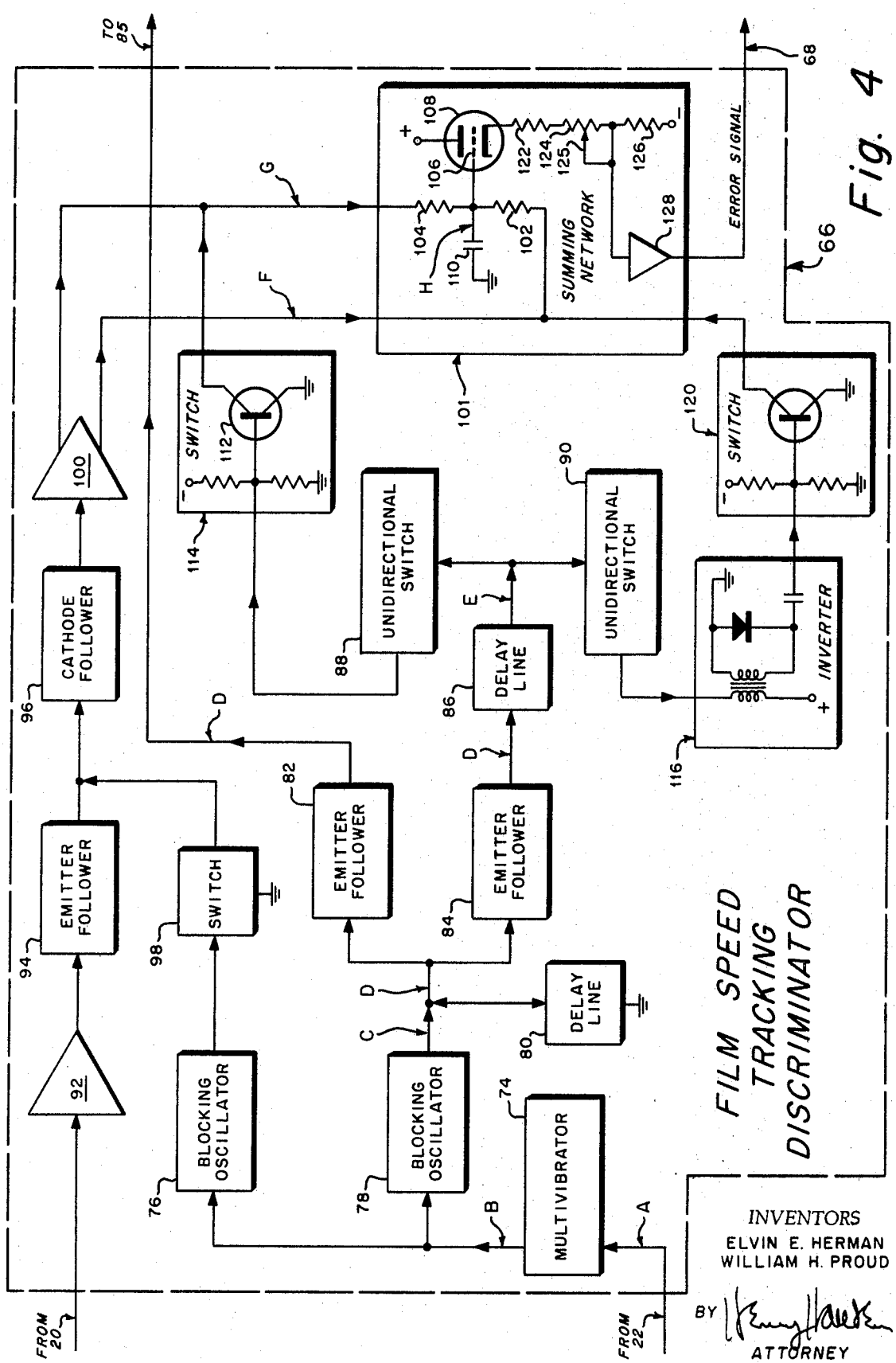

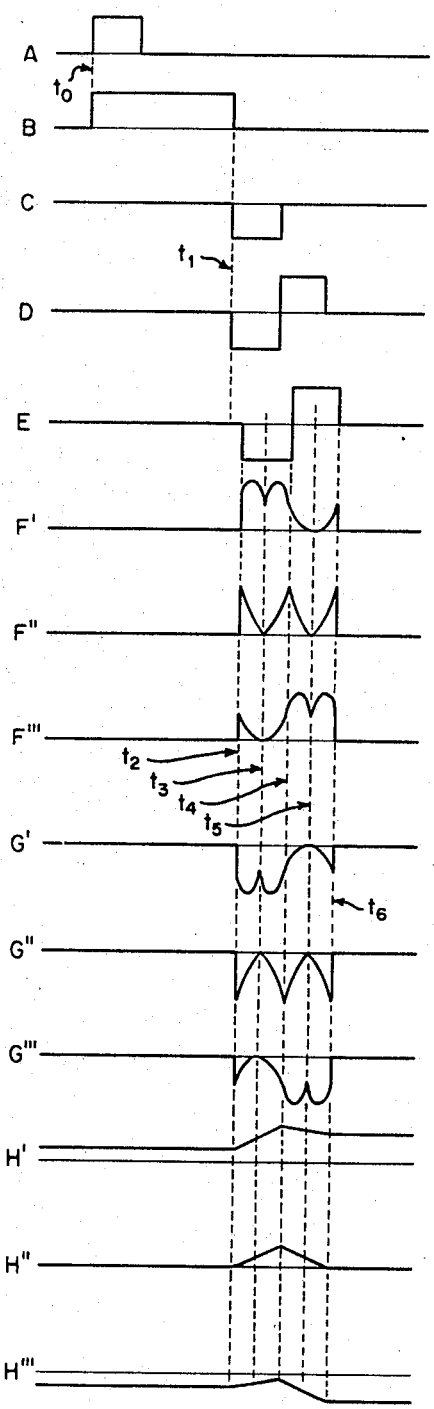
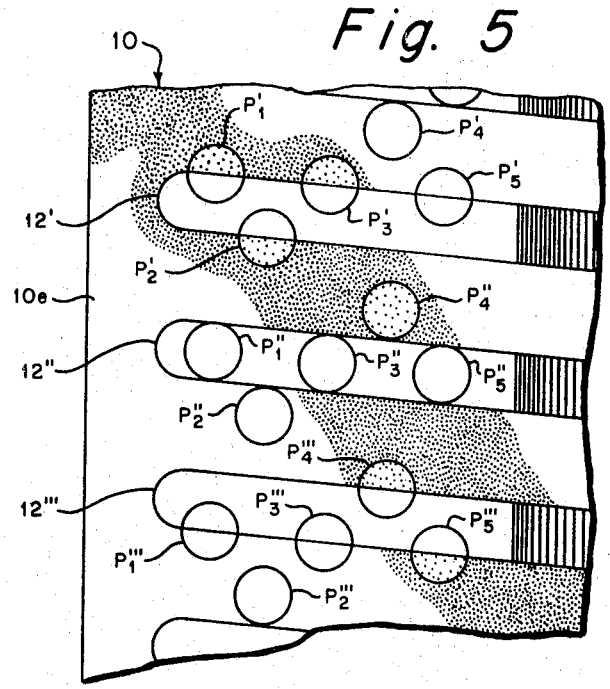
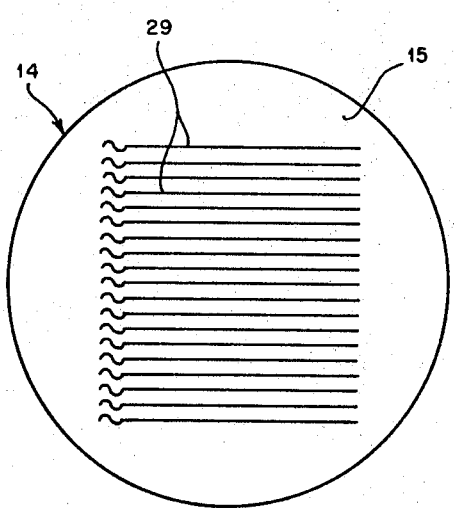
Fig. 5
Fig. 3
Fig. 6
INVENTORS
ELVIN E. HERMAN
WILLIAM H. PROUD
BY
ATTORNEY United States Patent Office 3,517,118
Patented June 23, 1970

3,517,118
CRT LINE-BY-LINE TRACKER WITH AUTO-
MATICALLY CORRECTING BEAM DE-
FLECTION CIRCUIT
Elvin E. Herman, Pacific Palisades, and William H.
Proud, Los Angeles, Calif., assignors, by mesne assignments, to the United States of America as represented by the Secretary of the Navy
Filed Oct. 17, 1966, Ser. No. 588,271
Int. Cl. G11b 7/00; H04n 5/86
U.S. Cl. 178—6.7    5 Claims

ABSTRACT OF THE DISCLOSURE

Apparatus for displaying information stored on film in a succession of closely spaced, parallel, intensity modulated tracks each having an initial constant intensity segment enabling a flying spot scanner, a photomultiplier tube and a signal processing discriminator to collectively provide for each track an error signal indicative of the degree and sense of any deviation of the scan path of the flying spot from each particular track with error signal is used not only to alter the transport speed of the film but also to deflect the location of the scan path in a direction to reduce the deviation. The discriminator causes the spot to be deflected first to one side and then to the other side of the constant intensity segment of each track and responds to the portion of the photomultiplier tube output signal occurring during the spot deflection process to provide the above-indicated error signal. Additionally, a signal generator providing a sinusoidally oscillating signal of relatively low frequency such as 2 c.p.s. is applied to sinusoidally vary the transport speed of the film simultaneously with successive deflections in the locations of transverse scanning paths in order to cause successive displacements of the path over the screen of the flying spot scanner cathode ray tube thereby reducing phosphor fatigue while scanning each track in succession.

Statement of Government interest

The invention described herein may be manufactured and used by or for the Government of the United States of America for governmental purposes without the payment of any royalty thereon or therefor.

Background of the invention

The present invention relates to line-by-line tracking apparatus and more particularly to means for sequentially aligning the scanning beam of a flying spot scanner with successive, closely spaced tracks of recorded information.

Radar video information can be recorded on film by recording successive radar scans on successive ones of parallel lines extending transversely across the width of the film.

Known apparatus for reading a film is unsuitable for faithful reproduction of the recorded information stored in narrow, closely spaced, intensity modulated tracks because known scanning beam aligning means are too insensitive to prevent the scanning beam from skipping from track to track and thereby missing recorded information. Phosphor fatigue of the cathode ray tube fluorescent screen becomes a problem because of continuous line scanning across a single portion thereof.

Summary of the invention

The general purpose of this invention is to provide an improved flying spot scanner having novel scanning beam aligning apparatus which includes deflection circuitry for causing the CRT (cathode ray tube) flying spot to undergo an initial orthogonal deflection from the line scan path when the CRT spot is being directed toward an initial constant intensity segment of each track and includes circuitry for processing the output of a CRT spot sensing PMT (photomultiplier tube) as affected by the spot oscillation for providing an error signal which is applied to effect a more exact alignment of the scan line path and the recorded informaiton track to be scanned. The present invention further contemplates the provision of unique apparatus to deflect successive line scan paths and synchronously vary the speed of a film driving motor whereby phosphor fatigue is greatly reduced.

An object of the present invention is the provision of improved means for aligning a cathode ray tube scanning spot relative to an intensity modulated information track for scanning same.

Another object is to provide scanning apparatus capable of sequentially reading successive parallel information tracks which are arranged transversely of the length of a moving film whereon they are recorded.

Still another object of the invention is the provision of cathode ray tube scanning apparatus wherein centers of successive scan paths respectively extend across vertically spaced portions of the tube screen whereby phosphor fatigue is reduced.

Other objects and advantages of the invention will hereinafter become more fully apparent from the following description of the annexed drawing which illustrates a preferred embodiment.

Brief description of the drawing

FIG. 3 represents a front view of the screen of the cathode ray tube of the apparatus of FIG. 2 having illustrated thereon successive scan paths;

FIG. 4 is a block and partial schematic diagram of a film speed tracking discriminator according to the invention included in the apparatus of FIG. 2;

FIG. 5 represents a magnified view of a fragment of the film of FIG. 1 including constant intensity track segments whereupon are shown three examples of successive scanning beam spot positions during three scanning path misalignments; and FIG. 6 is a timing diagram of typical waveforms present in the discriminator of FIG. 3 during the three scanning path misalignments of FIG. 5.

Description of the preferred embodiment

Figure 1:
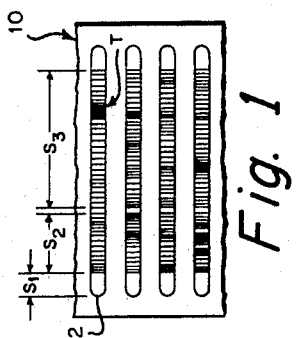
FIG. 1 represents a fragment of a developed radar video film to be scanned according to the invention wherein the recorded information track widths are exaggerated.

Referring now to FIG. 1, radar video has been recorded by imaging on film 10 an intensity modulated CRT (cathode ray tube) flying spot line scan, there being one such transverse line scan or information track 12 for each radar return received by the radar system. Each track includes an alignment segment $S_1$ having a recorded level of constant intensity and, thereby, constant density or transmission in the developed film. A next succeeding information segment $S_2$ of track 12 is intensity modulated in accordance with a code providing information useful in processing and displaying recorded radar video which code indicates such factors as antenna direction and other environmental factors which may include sea state, wind state, target type and target speed. A further succeeding information segment $S_3$ of the track 12 is intensity modulated in accordance with the video of the radar return for a particular pulse and may include well known indicia of a target as at T positioned at a range $R_T$.

The width of the recorded track 12, of course, depends upon the effective lens reduced width of the CRT line scan spot used to write the track. A convenient width has been found to be one-half mil. The spacing of the longitudinal axes or center lines of successive tracks depends upon the radar p.r.f. (pulse repetition frequency) and upon the film speed during recording. For example, center lines of successive tracks would be spaced 1.25 mils apart for a p.r.f. of 400 cycles per second and a recording film speed of one-half inch per second. The tracks 12 slightly deviate from perpendicular to the longitudinal axis of the film 10 by a factor dependent upon the scan time for writing each track and the film speed during recording.

Figure 2:
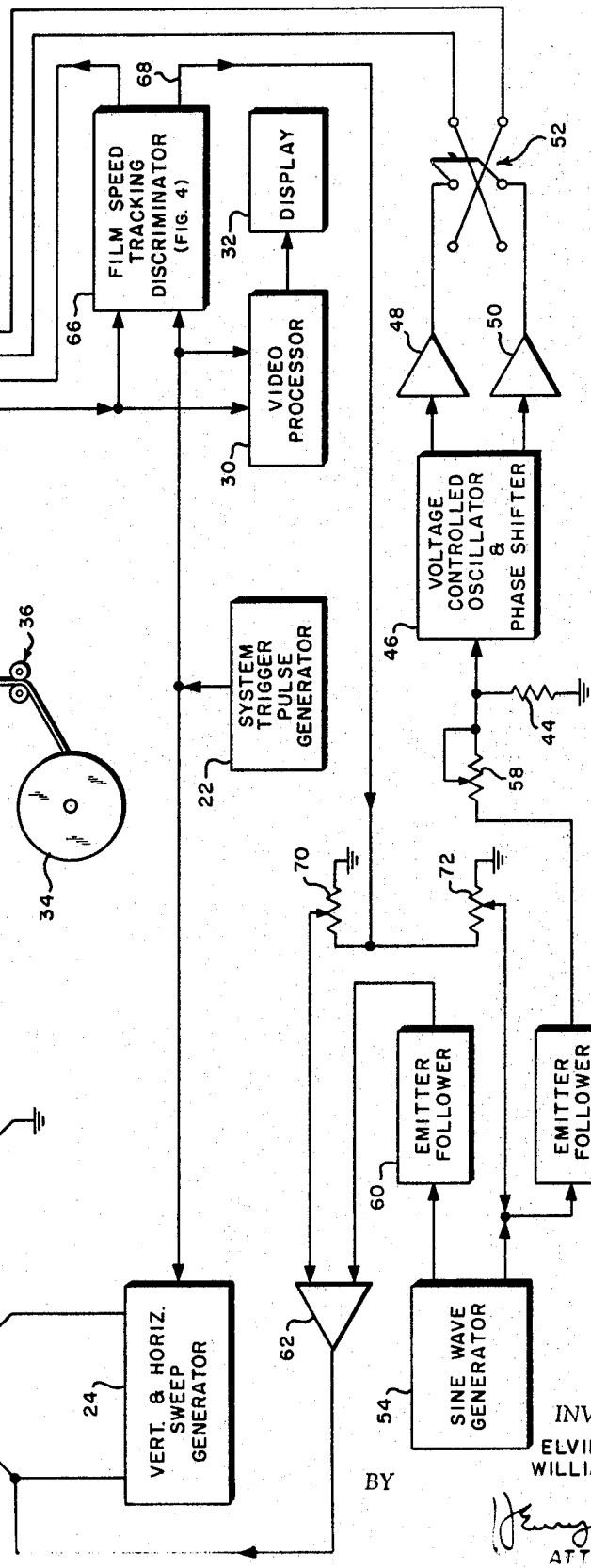
FIG. 2 is a block and partial schematic diagram of a scanning apparatus according to the invention.

In order to read the film of FIG. 1, the scanning apparatus of FIG. 2 includes a CRT 14 which directs a flying spot across its screen 15 to produce a moving beam of light figuratively indicated at 16 which extends through a focusing and size reducing lens 18 and through the information track 12 of the film 10 to a PMT (photomultiplier tube) 20. In response to a trigger pulse from a system trigger pulse generator 22 activated at the p.r.f. of the recorded radar video, the vertical and horizontal sweep generator 24 produces sweep voltages fed to vertical and horizontal deflection yokes 26 and 28 whereby a substantially horizontal line scan path, shown at 29 in FIG. 3, is produced which path 29 is to be suitably deflected to be aligned along the track 12 to be scanned. The manner of obtaining suitable sweep voltages for generating a substantially horizontal CRT scan path is well known. The CRT 14 is unblanked by well known circuitry (not shown) at some delay time after the trigger pulse is received so that the rate of horizontal scan at that time is in a substantially linear region. The phosphor decay time of the CRT screen 15 should be very short compared with the horizontal sweep time.

The PMT 20 produces an output of amplitude varying with the recorded intensity modulation of the track 12. This output is fed to a video processor 30 which is connected with the system trigger pulse generator 22 for receiving the trigger pulse so that the video processing is synchronized with the track scanning. The conventional video processor 30 responsively produces a suitable output signal which is fed to a display 32 which may comprise an oscilloscope whose horizontal sweep is timed to coincide with the portion of the scanning sweep along the segments $S_2$ and $S_3$ of the track 12 being read, varying vertical deflection of the display sweep occurring in accordance with the varying amplitude of the processed PMT output.

The film 10 is stored on a driven supply reel 34, is threaded through guide rollers 36 and 38 for positioning the tracks thereof for scanning in front of PMT 20 and is driven by a pressure roller drive mechanism 40 past the PMT 20 to a driven film storage reel 41. The mechanical structure for these elements is well known in the art.

The pressure drive mechanism 40 is driven by a motor 42 at such an average rate that the average film speed passing in front of the PMT 20 substantially equals the speed that the film was driven during recording. A suitable motor 42 is a two phase synchronous motor driven by electric power having a controlled frequency. A suitable control voltage, hereinafter more fully described which appears across resistor 44, is applied to a voltage controlled oscillator and phase shifter 46 which provides a pair of 90° phase separated outputs each having the same precisely controlled frequency and each being fed to a respective one of power amplifiers 48 and 50 whose amplified outputs are fed to the motor 42 through a reversing switch 52.

A suitable oscillator and shifter 46 may be constructed from a serially connected arrangement of two 90° phase shift oscillators and one 180° phase shift oscillator whose output is fed back to the first 90° phase shift oscillator. Included in the oscillator circuits are resistors whose resistance is proportional to the voltage across them. As the control voltage across resistor 44 is altered to change the voltages across the above indicated resistors, a phase shift in the output circuits of the 90° phase shift oscillators tends to occur which necessitates a frequency shift in the output to maintain the 360° closed loop phase shift. The variable oscillator outputs having voltage controlled frequency may be taken from the second 90° and the 180° phase shift oscillators and fed to the respective power amplifiers 48, 50. To insure that outputs having a given frequency are obtained from a given control voltage, the entire oscillator assembly is preferably packaged in an oven where a constant temperature is maintained. By varying the control voltage across resistor 44, the speed of the motor 42 may be correspondingly changed.

It is preferred that relative to the CRT screen 15 the center lines of successive scan paths 29 be vertically displaced from one another in order to reduce phosphor fatigue. To this end the speed of the film driving motor 42 is caused to vary synchronously with a variation in a controlled vertical deflection of the scan path so that successive paths 29 are aligned with corresponding successive tracks 12 while, relative to the CRT screen 15, the center lines of succeeding paths are vertically displaced from those of their preceding paths. This is accomplished by providing to the oscillator 46 a very slowly varying D.C. control voltage of an average amplitude sufficient to cause the film 10 to be driven at the same speed as that during recording, the average D.C. control voltage having superimposed thereon a sinusoidal voltage having a very low frequency such as 2 c.p.s. This varying control voltage is produced by a sine wave generator 54, and is fed through an emitter follower 56 and through a selectively variable resistor 58 for application to the oscillator 46. The resistor 58 may be adjusted to control the average speed of the motor 42. The varying control voltage amplitude caused by the sinusoidal variation is sufficient to cause the frequency of the output of oscillator 46 and therefore the speed of the motor 42 to vary approximately plus and minus 5%, the frequency of the variation being about 2 cycles per second as indicated above.

Similarly, a synchronous sinusoidal beam deflection voltage having the same frequency of 2 c.p.s. is produced by the generator 54 and is fed through an emitter follower 60 and an amplifier 62 to the vertical deflection yoke 26 on the CRT 14. Of course, the amplified beam deflection voltage fed to the yoke 26 is of sufficient successive instantaneous amplitudes to cause the focused CRT scanning path 29 to be deflected from its immediately preceding position relative to the PMT 20 by a sufficient vertical distance corresponding to the incremental change in average distance over which the aligning segment of the next track 12 to be scanned moved during the time between successive CRT unblankings for successive scans. This incremental change in average distance of track movement is attributable to the corresponding incremental change in average film speed caused by the synchronous variation in the control voltage applied to oscillator 46. Examples of succesive path deflections in exaggeration are illustrated in FIG. 3.

Since the average film speed and the scan repetition frequency of the scanning apparatus may not exactly be the same as those during the recording of the radar video and since the film speed and the scan path position are being synchronously varied in the manner described above, there is a likelihood that the CRT scanning spot will fail to be aligned with successive tracks on the film 10. A film speed tracking discriminator 66 also connected to receive the output signal of PMT 20 provides a means of insuring that the CRT spot will remain aligned with successive tracks of the film and that the CRT spot will not miss any tracks during readout.

Immediately after the CRT 14 is unblanked, the discriminator 66 activates a one cycle oscillation of the CRT spot for controlled deflections above and below the projected scan path 29 as exaggerated in FIG. 3, while the beam is within the range of the constant intensity segment $S_1$ of the track 12. This spot deflection is more clearly illustrated in FIG. 5 wherein the aforedescribed track deviation from a position normal to the film's edge 10e is exaggerated. Exemplary variations in the PMT output caused by variation in spot intensity during the relative movement of the CRT spot across the lateral boundaries of the constant intensity level segment $S_1$ is similar to that illustrated by waveforms F', F" and F"' of FIG. 6, and the discriminator 66 produces in response thereto corresponding error signals which are fed via a conductor 68 to inputs of grounded, adjustable potentiometers 70 and 72.

The output voltage of potentiometer 70 is applied to an input of an amplifier 62 for producing an output of amplitude sufficient to so vertically deflect the scan path 29 that it is realigned substantially along the center of the track 12. The amplifier 62 is a special purpose amplifier for obtaining an algebraic subtraction of the error voltage from the sine wave voltage. Conventionally, the sine wave voltage from generator 54 via emitter follower 60 is applied to a grid of a tube in the amplifier, and the error voltage from the output of potentiometer 70 is so coupled as to correspondingly drive the cathode, the amplifier 62 output being taken from the plate of the tube. As described above, the output of amplifier 62 is fed to the CRT vertical deflection yoke 26. The output voltage of potentiometer 72 is fed to the emitter follower 56 along with the signal from the generator 54 and is utilized to incrementally adjust the level of the aforedescribed slowly varying control voltage applied to the oscillator 46 whereby the speed of the motor 42 may be incrementally correspondingly changed in order that successive line scan paths may be more closely aligned along centers of corresponding succeeding tracks 12.

Referring now to FIG. 4, at the beginning of each scan cycle in accordance with the p.r.f. of the recording, a trigger pulse is fed at time $t_0$ from the system trigger pulse generator 22 to a multivibrator 74 in the film speed tracking discriminator 66. The trigger pulse, indicated by waveform A of FIG. 6, causes the multivibrator 74 to emit a positive rectangular pulse B having a width in time corresponding to the time which it takes the horizontal sweep voltage generated by generator 24 to begin to increase at a linear rate. The unblanking point in time establishes the point along segment $S_1$ of the track 12 at which the CRT spot will first be observed by the PMT 20.

The waveform B from the multivibrator 74 is fed to both blocking oscillators 76 and 78. In response to receiving the trailing edge of the waveform B, the blocking oscillator 78 produces at time $t_1$ a negative pulse of controlled duration such as 2 microseconds generally indicated as waveform C which waveform is fed to a grounded delay line 80 and to emitter followers 82 and 84. The delay line 80 responsively produces a reflection delayed in time of the negative pulse C which is also applied to the emitter followers 82, 84 so that they can in effect receive a squared S waveform D. It is contemplated that other symmetrical, alternating waveforms such as a sine wave could be correspondingly generated, and the squared S waveform D is only illustrative of a suitable waveform. The S waveform output of the emitter follower 82 is fed to an auxiliary vertical deflection yoke 85 of the CRT 14 to cause the CRT spot to be correspondingly deflected equal amounts substantially equal to the reduced spot width above and below the projected line scan path as indicated in the examples in FIG. 5. While it is contemplated that the deflections may be accomplished either electrostatically or electromagetically by normal CRT deflection circuits, it is preferred that auxiliary plates or yokes, as shown, be used because of the deflection rates involved. The amplitude of deflection should not be so great as to cause the spot to appear in segment $S_1$ of either of the tracks 12 immediately adjacent the track being scanned. Simultaneously, the S waveform output from emitter follower 84 is fed through a serially connected delay line 86 to a pair of unidirectional switches 88 and 90.

The output of the PMT 20 is fed to a video amplifier 92 and through an emitter follower 94 to the grid of a cathode follower 96 which grid is electrically connected to a switch 98 and is normally clamped to ground by the normally conducting switch 98 so that the cathode follower normally has no output. The waveform B from multivibrator 74 is also received by the blocking oscillator 76 which produces in response to the trailing edge thereof a pulse of a duration coincident with the time interval during which the PMT output includes the effects of CRT spot deflection by the waveform D from emitter follower 82 and of an amplitude sufficient to bias the switch 98 into a state of non-conduction whereby the grid of the cathode follower 96 is unclamped from ground so that the amplified, spot deflection affected, PMT output may be fed through cathode follower 96 to a paraphase amplifier 100. The conventional paraphase amplifier 100, responsively produces a pair of outputs F and G which are fed into summing network 101 to inputs of respective resistors 102 and 104, having equal resistances, the G waveform being the inverse of the F waveform. The other ends of the resistors 102, 104 are electrically connected together and to a grid 106 of a tube 108. A capacitor 110 is interposed between ground and the common connection of resistors 102, 104 and the grid 106.

The serial delay line 86 delays the squared S waveform D a time corresponding to the loop delay time between the time $t_1$ when the CRT beam is deflected by that wave and the time $t_2$ when the PMT output begins to include the effects of the scanning spot deflection. The negative portion of this delayed S wavefore E causes unidirectional switch 88 to operate to cause a signal to be fed to the base of a transistor 112 of a switch 114 which is sufficient to bias the transistor into a state of conduction as long as waveform E is negative. The emitter of the transistor 112 is connected with ground while its collector is connected with the input side of the resistor 104. Therefore, as long as the signal applied to the switch 88 is negative, the switch 114 operates to clamp one of the outputs of the paraphase amplifier 100 with ground whereby waveform G is diverted to ground. Similarly, the unidirectional switch 90 operates in response to the positive portion of the delayed S waveform E to cause a signal to be fed through a polarity inverter 116 to the base of a transistor 118 of a switch 120 which is sufficient to bias the transistor into a state of conduction as long as the waveform E received by the switch 90 is positive. The emitter of the transistor 118 is connected with ground while its collector is connected with the input side of the resistor 102. Therefore, as long as the delayed waveform E is in a positive state, the other input of the paraphase amplifier 100 is clamped to ground through the switch 120 whereby the waveform F is diverted to ground. Consequently, the portion of waveform F while the waveform E is negative is applied across the resistor 102 to change the charge on the capacitor 110, the corresponding portion of waveform G being diverted to ground; and thereafter the portion of waveform G while the waveform E is positive, is applied across the resistor 104 to change the existing charge on the capacitor 110 and thereby effect the resultant voltage on the grid 106, the corresponding portion of waveform F being diverted to ground. In this manner, the integrated output of the PMT 20 as affected by the negative or downward portion of the CRT spot deflection is effectively applied to the capacitor 110 and also the grid 106 of the tube 108, and thereafter the inversion of the output signal of the PMT as affected by the positive or upward portion of the spot deflection is algebraically added to the capacitor charge including the effects of the first half of the deflection affected output.

The time constant of the discharge of the capacitor 110 to ground through either resistor 102 or 104 is desirably long compared with the time for a horizontal scan cycle in order that the charge placed upon the capacitor in accordance with the signal applied through one of the resistors 102, 104 is not quickly diverted to ground when that resistor is suddenly clamped to ground by action of the clamps 120, 114 and in order that the error signal is maintained throughout the remainder of the scan cycle.

The anode of the tube 108 is connected to a positive D.C. source while its cathode is serially connected through a biasing resistor 122, a resistor 124 including an adjustable tap 125, and a biasing resistor 126 to a negative D.C. supply. The input side of resistor 126 is electrically connected with both the tap 125 and an input terminal of a bipolar amplifier 128. The position of the tap 125 is adjusted to that point at which the output signal to the summing amplifier 128 is zero with respect to ground when the charge on the capacitor 110 has remained substantially unchanged from zero during the application of the first half and inverted second half of the output of the PMT 20 as when the projected scan path 29 is in proper position relative to the track 12 being scanned. Therefore, if the resulting charge on the capacitor 110 represents an increase or a decrease after having applied thereto the aforedescribed portions of waveforms F and G, the bipolar amplifier 128 receives and amplifies this error signal which is an indication of polarity of the capacitor charge and thereby the direction and degree of misalignment of the projected path with the track. The output of the bipolar amplifier 128 comprises the amplified error signal which is fed via conductor 68 to the potentiometers 70 and 72.

The film speed tracking discriminator 66 may perhaps be better understood by some illustrative examples of possible error in projected scan path alignment with the track center line. Referring to FIG. 5, three examples of misalignment error are illustrated wherein are shown five successive CRT spot positions relative to each of the segments $S_1$ of tracks 12', 12" and 12"' during the deflection cycle caused by the waveform D. Referring to track 12', the waveform F' at time $t_2$ corresponds to the output of the PMT 20 as affected when the CRT was unblanked and the beam spot first appeared in a position $P'_1$. Thereafter in accordance with the waveform D, the spot was deflected laterally across the constant intensity segment $S_1$ of the track 12'. This caused the PMT output to relatively increase in amplitude until the spot was positioned along the center line of the track 12'. Thereafter the PMT output decreased as the CRT spot continued to move toward the opposite boundary of the segment, $S_1$, reaching a position $P'_2$ at time $t_3$ less loop delay time. Similarly, the PMT output experienced another increase and decrease as the spot moved across the center of the segment $S_1$ reaching a position $P'_3$ at time $t_4$ less the loop delay time. The PMT output has a minimum amplitude at time $t_5$ since at a position $P'_4$ the CRT spot was entirely obscured by the unexposed area of the film beyond the longitudinal boundary of the track 12'. The PMT output thereafter correspondingly increased as the spot moved to a position $P'_5$ at time $t_6$. The CRT spot locations to produce the instantaneous PMT outputs at times $t_2$, $t_4$, $t_6$ indicate that the projected path of this particular scan lay along the upper longitudinal boundary of the track 12'; and, in order to realign the line scan path along the center of the track 12', the error signal responsively produced by discriminator 66 and ultimately fed to the vetrical yoke 26 of the CRT is of sufficient amplitude to cause the scan path to be deflected downwardly one quarter of a mil corresponding to the misalignment of the spot center and the track 12' centerline.

Between time $t_1$ when the trailing edge of the waveform B appeared from multivibrator 74 and time $t_2$ when first appeared in PMT output the effects of the CRT spot deflection, the blocking oscillator 76 is activated by the trailing edge of waveform B to cause the switch 98 to release the grid of the cathode follower 96 from ground so that the PMT output signal during the CRT spot deflection cycle is passed to the paraphase amplifier 100 for responsively producing the waveform F' and its inverse, G'. At time $t_2$ the unidirectional switch 88 is activated to cause the switch 114 to clamp the input side of the resistor 104 to ground. Consequently, while the first half of waveform G' cannot affect the charge on the capacitor 110, the first half of waveform F' is applied across the resistors 102 and 104 thereby increasing the charge across the capacitor 110 shown in exaggeration by waveform H'. Thereafter at time $t_4$, the input side of the resistor 104 is disconnected from ground, and the input side of the resistor 102 is clamped to ground through the switch 120 so that the last half of the waveform G' may be applied across the resistors 104 and 102 to slightly decrease the charge on the capacitor 110 substantially as shown by H'. The resulting positive error signal is amplified by amplifier 128 and fed via the conductor 68 to the potentiometer 70 whose output amplitude may be precisely adjusted so that the sinusoidal voltage from the sine wave generator 56 is sufficiently incrementally changed in the amplifier 62 to deflect the projected scan path for realignment along the center of the track 12'. As indicated above, the positive error signal is also fed to the potentiometer 72 whose positive output is fed through the emitter follower 56 to incrementally increase the control voltage applied to the oscillator 46 so that the speed of the motor 42 is correspondingly increased whereby the succeeding tracks 12 are more exactly positioned relative to the projected line scan path.

Referring to track 12" of FIG. 5, it is seen from spot positions $P''_1$, $P''_3$ and $P''_5$ that the projected line scan path lies along the centerline of track 12 and that no error in alignment exists. Referring to waveforms F" and G", it is seen that the average of the first half of the waveform F" is opposite in polarity and equal in magnitude to the average value of the second half of the negative waveform G". Consequently, no net change occurs in the charge on the capacitor 110.

Referring to track 12"' in FIG. 5, it is seen from spot positions $P'''_1$, $P'''_3$ and $P'''_5$ that the projected line scan path lies along the lower boundary of the track 12"'. Referring to the waveforms F''' and G''', it is seen that the average value of the first half of positive waveform F''' is greatly exceeded by the average value of the second half of the negative waveform of G'''. Consequently, a net decrease occurs in the charge across the capacitor 110, as shown in the waveform H'''. The resulting negative signal is amplified and utilized as above described to decrease the speed of the motor and to cause the correctional upward deflection of the projected line scan path to a realigned scan path which lies along the centerline of track 12"'.

While the invention has been described as being used to scan positive film, it is contemplated that negative film could be utilized.

It is further contemplated that the CRT spot may be subsequently vertically oscillated about the centerline of the realigned scan path through information segments $S_2$ and $S_3$ at a frequency such as 15 megacycles which is must greater than the horizontal sweep rate and the phosphor decay time of the screen with an oscillation amplitude sufficient to drive the spot slightly beyond the boundaries of the track being scanned in order to eliminate any error introduced by reason of slight scan path curvature. When this approach is used, the reduced CRT spot width may be substantially less than the width of the tracks to be scanned as long as the spot is initially deflected beyond the longitudinal boundary of the segment $S_1$ during the error signal obtaining portion of the scan.

Thus, there has been provided scanning apparatus wherein phosphor fatigue is reduced and which is capable of sequentially reading successive closely spaced tracks of recorded information transversely aligned with respect to the movement of film upon which they are recorded, each of the tracks including an initial segment of constant intensity from which the scan path aligning apparatus may determine the degree and polarity of alignment error and produce an error signal for correctly positioning the scan path with respect to each given track.

It should be understood, of course, that the foregoing disclosure relates only to a preferred embodiment of the invention and that numerous modifications or alterations may be made without departing from the spirit and scope of the invention as set forth in the appended claims.

What is claimed is:

1. Apparatus comprising:
  information storage means having stored thereon a recorded track of intensity modulated information, said track including a constant intensity segment;
  a flying spot scanner for scanning a spot along a path parallel to said track of information and providing a scanner output signal;
  signal generating means connected to said scanner for providing a symmetrical, alternating signal for transversely deflecting said spot to one side of said path and to the other side of said path in accordance therewith when said flying spot is adjacent said constant intensity segment;
  paraphase means receiving said scanner output signal for providing a first output signal varying with said scanner output signal and a second output signal which is the inverse of said first output signal;
  first switch means connected to said signal generating means for receiving said alternating signal and to said paraphase means for receiving said second output signal for blocking that portion of said first output signal produced during said transverse deflection of said spot to one side of said path;
  second switch means connected to said signal generating means for receiving said alternating signal and to said paraphase means for receiving said second output signal for blocking that portion of said second output signal produced during said transverse deflection of said spot to the other side of said path; and
  algebraic summing means connected to said first and second switch means for receiving the unblocked portions of said first and second output signals for providing a path deviation signal indicative of magnitude and direction of deviation of said path to said track, said deviation signal being applied to said scanner for correcting the path deviation.

2. Apparatus according to claim 1 wherein said summing means comprises:
  a first resistor having one end connected to said first switch means for receiving said unblocked portion of said first output signal;
  a second resistor having one end connected to said second switch means for receiving said unblocked portion of said second output signal;
  the other ends of said first and second resistors being electrically connected together; and
  a capacitor connected between ground and the common connection of said first and second resistor;
  the time constant of discharge of said capacitor through either of said resistors being long compared to the time for scanning the entire said track; and
  said path deviation signal appearing at said common connection of said resistors and said capacitor.

3. Apparatus for extracting intensity modulated information from information storage means having a plurality of parallel tracks of information comprising:
  a flying spot scanner for sequentially scanning at a scan repetition rate successive tracks along paths extending parallel to said tracks and providing a scanner output signal;
  track positioning means for moving said plurality of tracks of information transversely of said path at a speed for sequentially positioning succeeding tracks adjacent to a path for scanning;
  first signal generating means for providing an output signal applied to said flying spot scanner for deflecting the flying spot transversely of said path;
  discriminator means connected to receive said scanner output signal produced during said transverse deflecting of said spot for providing a path deviation signal indicative of the magnitude and direction of deviation of said path from said track, said path deviation signal being applied to said scanner for reducing path deviation;
  second signal generating means for providing a cyclically varying signal having a frequency substantially less than said scan repetition rate;
  means connected to said signal generating means for receiving said cyclically varying signal and responsively providing at an output a similarly varying deflection signal, said means having said output connected with said scanner for successively transversely deflecting said paths; and
  speed adjusting means connected to said second signal generating means for receiving said cyclically varying signal and connected to said track positioning means for varying said speed of track positioning in response to said varying signal;
  successive transverse deflections of said path in accordance with said cyclically varying signal having an incremental change in degree of deflection corresponding to the incremental distance which is the product of the time between successive scannings and the concurrent incremental change in said speed of track movement.

4. Apparatus according to claim 3 wherein said speed adjusting means further includes means connected to said track positioning means and to said discrimminator means for receiving said path deviation signal and responsive thereto for additionally incrementally increasing said speed of transverse track movement when said sequential scanning begins before the track to be scanned has reached said path and for additionally incrementally decreasing said speed when said track has moved beyond said path when said sequential scanning begins.

5. Apparatus according to claim 4 further comprising:
  first and second potentiometer means connected to receive said path deviation signal for attenuating said path deviation signal;
  means connected to said first potentiometer means and to said second signal generator means for applying a combination of said cyclically varying signal and said attenuated path deviation signal to said speed adjusting means; and
  difference amplifier means connected to said second potentiometer means and to said second signal generator means for applying the difference of said cyclically varying signal and said attenuated path deviation signal to said scanner for reducing path deviation.

References Cited

UNITED STATES PATENTS

| | | | |
|---|---|---|---|
| 3,321,337 | 11/1965 | Quinn | 340—173 |
| 2,575,445 | 11/1951 | Germer | 179—100.3 |
| 3,267,212 | 8/1966 | Goldmark | 178—7.2 |
| 2,851,521 | 9/1958 | Clapp | 179—100.3 |

BERNARD KONICK, Primary Examiner

J. ROSENBLATT, Assistant Examiner

U.S. Cl. X.R.

179—100.3